US010259417B1

(12) United States Patent
Ratkovich (10) Patent No.: US 10,259,417 B1
(45) Date of Patent: Apr. 16, 2019

(54) GOLF CART SAFETY PLATFORM WITH INTERCHANGEABLE HANDLE BARS

(71) Applicant: John Ratkovich, North Barrington, IL (US)

(72) Inventor: John Ratkovich, North Barrington, IL (US)

( * ) Notice: Subject to any disclaimer, the term of this patent is extended or adjusted under 35 U.S.C. 154(b) by 75 days.

(21) Appl. No.: 15/713,653

(22) Filed: Sep. 23, 2017

Related U.S. Application Data (60) Provisional application No. 62/399,130, filed on Sep. 23, 2016.

(51) Int. Cl.
*B60N 3/02* (2006.01)
*B60N 3/10* (2006.01)
*B60R 21/02* (2006.01)

(52) U.S. Cl.
CPC .......... *B60R 21/02* (2013.01); *B60N 3/02* (2013.01); *B60N 3/023* (2013.01); *B60N 3/101* (2013.01); *B60R 2021/028* (2013.01)

(58) Field of Classification Search
CPC .......... B60R 21/02; B60R 2021/028; B60R 2020/0213; B62D 39/00; B60N 3/02; B60N 3/023; B60N 3/026; B60N 3/101; B60N 3/103
USPC .......................................... 280/748; 224/274
See application file for complete search history.

(56) References Cited

U.S. PATENT DOCUMENTS

| | | | | | |
|---|---|---|---|---|---|
| 2,923,558 A | * | 2/1960 | Schepers | ................. | B60R 21/02 280/748 |
| 3,044,800 A | * | 7/1962 | Wicker | ................. | B60R 21/026 108/149 |
| 3,282,604 A | * | 11/1966 | Goldberg | ............. | B60N 2/2884 280/748 |
| 3,502,368 A | * | 3/1970 | Maxa | ................. | B66F 9/07545 280/748 |
| 4,392,660 A | * | 7/1983 | Mason | ................... | B60J 5/0487 105/440 |
| 5,022,626 A | * | 6/1991 | Nozel | .................... | B60N 3/101 224/926 |

(Continued)

FOREIGN PATENT DOCUMENTS

DE 1047651 B * 12/1958 ........... B60R 21/102

*Primary Examiner* — Ruth Ilan
(74) *Attorney, Agent, or Firm* — Steven Ivy P.C.

(57) ABSTRACT

Disclosed is a golf cart safety platform with interchangeable handle bars. Said platform, rectangular in shape, is attached to the golf cart's floor, via a strong, metal-bonding adhesive. Attached to the platform's top surface, via similar metal-bonding method, is a single, or a plurality of stanchion bases. Each stanchion base incorporates a vertical socket, accepting a socket pin. The pin locks in place the interchangeable handle bars, with relative ease, and without the need for the metal-bonding adhesives. The handle bars come in different shapes and sizes, including but not limited to: I-shaped, H-shaped, U-shaped and goalpost-shaped bars. Each of the handle bars may be outfitted with a food and accessory tray. The tray provides its end-users, thus the golf cart driver and its passenger, with the ability to store food and small, personal objects. In addition to its storage capabilities, the tray also incorporates two, oval-shaped, grip handles—providing the end-users with extra surfaces to hold on to, when driving the golf cart through difficult terrain.

5 Claims, 6 Drawing Sheets

(56) References Cited

U.S. PATENT DOCUMENTS

| | | | | |
|---|---|---|---|---|
| 5,454,596 A * | 10/1995 | Dirck | ................ | B60R 21/02 |
| | | | | 104/241 |
| 5,690,307 A * | 11/1997 | Joyce | ................ | B60N 3/101 |
| | | | | 224/929 |
| 5,791,634 A * | 8/1998 | Brown | ................ | B60R 3/005 |
| | | | | 256/1 |
| 6,227,425 B1 * | 5/2001 | Ware, Sr. | ................ | A63B 71/06 |
| | | | | 224/276 |
| 6,315,252 B1 * | 11/2001 | Schultz | ................ | B60R 11/0252 |
| | | | | 108/44 |
| 6,902,024 B2 * | 6/2005 | Muller | ................ | B60K 28/04 |
| | | | | 180/271 |
| 7,090,276 B1 * | 8/2006 | Bruford | ................ | B60R 3/02 |
| | | | | 296/1.02 |
| 7,156,443 B1 * | 1/2007 | Jung | ................ | B60N 2/24 |
| | | | | 280/748 |
| D691,860 S * | 10/2013 | Berio, Jr. | ................ | D7/619.1 |
| 9,381,976 B1 * | 7/2016 | Corley | ................ | B63B 17/00 |
| 9,649,965 B1 * | 5/2017 | Burkhardt | ................ | B60N 3/023 |
| 9,981,572 B2 * | 5/2018 | Ye | ................ | B60N 2/90 |
| 10,081,275 B2 * | 9/2018 | Kluka | ................ | B60N 2/3097 |
| 2007/0023466 A1 * | 2/2007 | Policastro | ................ | B60R 9/00 |
| | | | | 224/42.39 |
| 2007/0152436 A1 * | 7/2007 | Kwok | ................ | B60R 22/04 |
| | | | | 280/749 |
| 2010/0096876 A1 * | 4/2010 | Fletcher | ................ | B60N 2/01 |
| | | | | 296/64 |

* cited by examiner

FIG. 6

GOLF CART SAFETY PLATFORM WITH INTERCHANGEABLE HANDLE BARS

RELATED PATENT APPLICATION

The present Non-Provisional U.S. Patent Application claims the priority from U.S. Provisional Patent Application No. 62/399,130, filed on Sep. 23, 2016, the subject matter of which is incorporated herein by reference.

FIELD OF THE INVENTION

The present invention relates to safely devices utilized in low-speed electric vehicles, commonly referred to as the neighborhood vehicles and/or golf carts.

BACKGROUND OF THE INVENTION

The present invention addresses golf cart-related safety devices. Golf carts popularity has been on the rise for many decades. The aging population, new comfort features and ever improving electronic components, have all contributed to an improved quality of today's golf carts, and their rising popularity.

Along with the rising popularity of golf carts, the number of golf cart-related injuries has increased significantly. A study conducted by researchers in the Center for Injury Research and Policy of The Research Institute at the Nationwide Children's Hospital found that the number of golf cart-related injuries rose 132% during the 17-year study period. Some of the main causes of injury related to golf cart accidents included cart overturn and collisions. However, "falling from a golf cart" was the most common cause of injury for both adults and children. One contributing reason is that current golf cart safety features are insufficient to prevent passenger falls or ejection. Golf carts moving at speeds as low as 11 miles per hour could readily eject a passenger during a turn, causing a a plethora of injuries.

The presented invention addresses the above-defined shortcomings by introducing a simple, yet effective, safety device, giving the occupants of a golf cart, something to hold on to. Specifically, the present invention discloses a GOLF CART SAFETY PLATFORM WITH INTERCHANGEABLE HANDLE BARS. The platform is attached to the center section of the golf cart's flooring, between the seat and the accelerator/brake pedals, providing the occupants with a gripping surface, helping them to maintain their seating balance, and possibly preventing them from falling out of the vehicle.

SUMMARY OF THE INVENTION

The following is intended to be a brief summary of the invention and is not intended to limit the scope of the invention:

The present invention discloses of golf cart safety platform with interchangeable handle bars. Said platform, rectangular in shape, is attached to the golf cart's floor, via a strong, metal-bonding adhesive. Attached to the platform's top surface, and using the same metal-bonding method, is a plurality, or a single stanchion base. Each stanchion base incorporates a vertical socket, accepting a socket pin. The pin is designed to lock in place the interchangeable handle bars, with relative ease, and without the need for the metal-bonding adhesives. The handle bars come in different shapes and sizes, including but not limited to: I-shapes, H-shaped, U-shaped and goalpost-shaped bars. Each of the handle bars may be outfitted with a food and accessory tray. The tray provides its end-users, thus the golf cart driver and its passenger, with the ability to store small objects and food-related items. In addition to its storage capabilities, the tray also incorporates two addition handle bars, providing its end-users with a plethora of safety features.

BRIEF DESCRIPTION OF THE DRAWINGS

The components shown in the drawings are not to scale. In the interest of clarity, some of the components might be shown in a generalized form and could be identified utilizing commercial designations. All components, including its essential features, have been assigned reference numbers that are utilized consistently throughout the descriptive process outlined herein.

DESCRIPTIVE KEY

100—Safety Platform
101—long side
102—short side
103—top surface
104—top surface middle section
105—bottom surface
200—Stanchion Base
201—top surface
202—bottom surface
203—vertical socket 204—vertical socket pinhole
205—socket pin
206—socket supporting rod arch
300—Handle Bar, I-Shaped
301—mounting end, with a pin hole
302—handle grip end
303—middle handle grip
304—vertical bar
400—Handle Bar, U-Shaped
401—first vertical bar
402—first vertical bar mounting end, with a pin hole
403—first vertical bar middle handle grip
404—first vertical bar transition end
405—second vertical bar
406—second vertical bar mounting end, with a pin hole
407—second vertical bar middle handle grip
408—second vertical bar connecting end
409—horizontal bar
410—first end
411—second end
412—middle section handle grip
500—Handle Bar, H-Shaped
501—long vertical bar
502—mounting end, with a pin hole
503—middle section grip handle
504—handle grip end
505—horizontal bar
506—first end
507—second end
508—short vertical bar
509—first handle grip end
510—middle section
511—second handle grip end
600—Handle Bar, Goalpost-Shaped
601—long vertical bar
602—mounting end, with a pin hole
603—middle section grip handle
604—connecting end
605—horizontal bar
606—first end
607—second end
608—first short vertical bar
609—connecting end
610—handle grip end
611—second short vertical bar
612—connecting end
613—handle grip end
700—Food and Accessory Tray
701—mounting hole
702—top surface
703—first elongated pocket
704—second elongated pocket
705—bottom surface
706—first cutout
707—first oval grip handle
708—second cutout
709—second oval grip handle
800—Golf Cart
801—seat
802—floor
803—dash board
804—steering column
805—accelerator and brake pedals
900—End-User/Golf Cart Driver

DETAILED DESCRIPTION OF THE PREFERRED EMBODIMENT

The following description references to the above-defined drawings and represents only an exemplary embodiment of the invention. It is foreseeable, and recognizable by those skilled in the art, that various modifications and/or substitutions to the invention could be implemented without departing from the scope and the character of the invention:

As shown in FIGS. 1, 2, 3, 4, 5, 6, the present invention discloses a golf cart 800 safety platform 100 with interchangeable handle bars 300, 400, 500 and 600. The platform, having two long 101 and two short 102 sides, is rectangular in shape. To utilize the present invention the end-user 900 must attach the safety platform 100 to the floor 802 of a golf cart 800.

Figure 6:
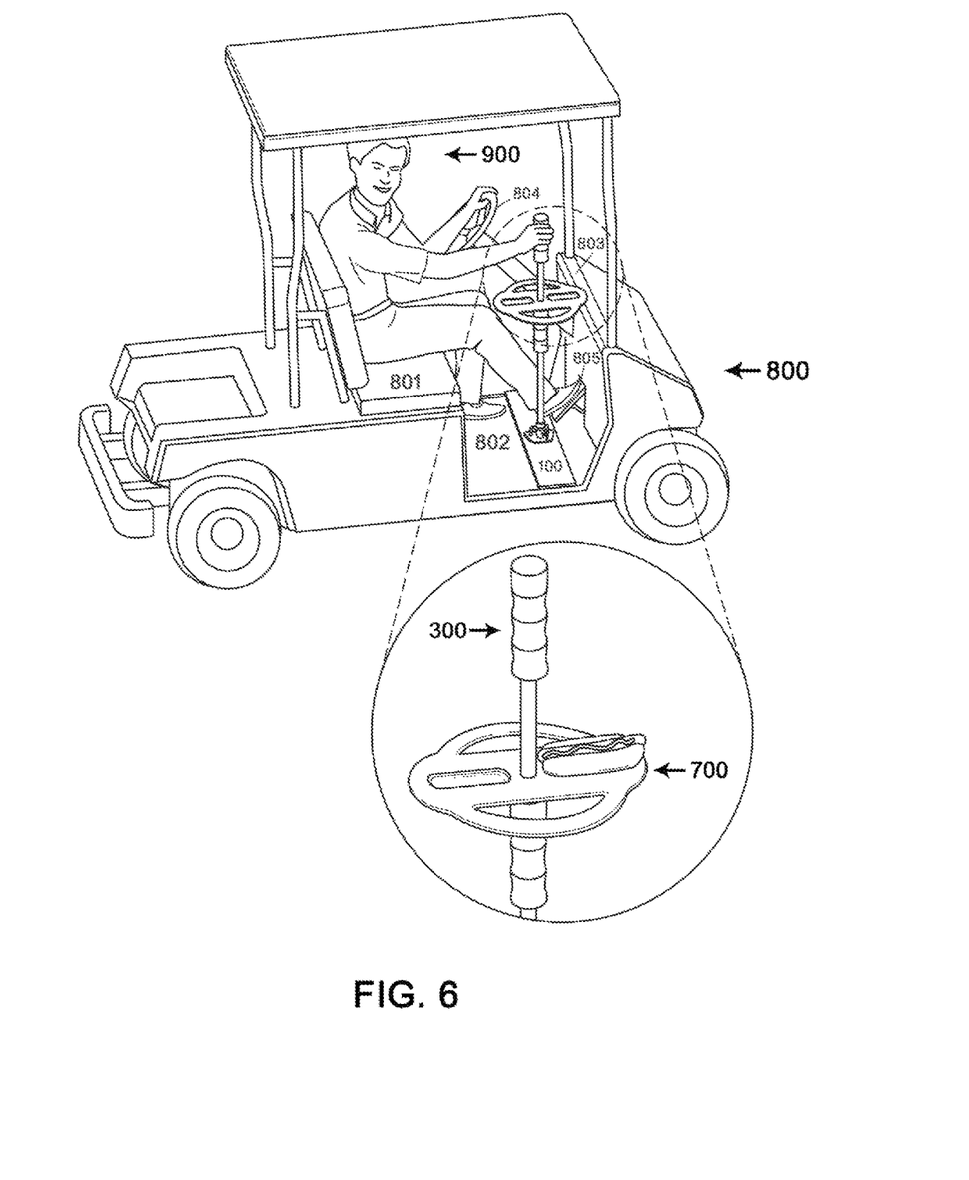
FIG. 6 is a pictorial view of a golf cart, driven by the end-user, holding the I-shaped handle bar; wherein said I-shaped bar handle is attached to the golf cart's floor, between the seat and the accelerator/brake pedals, including an enlarged detail view of the food/accessory tray holding a hot dog, in accordance with an exemplary embodiment of the present invention.

The platform 100 is attached using a permanent, metal-bonding adhesive, which is applied to its bottom surface 105. For best results, the platform 100 should be placed between the seat 801 and the dash board 803, near the accelerator and the brake pedals 805 of the golf cart 800, as shown in FIG. 6. Minor adjustment to the final positioning of the platform 100 are permissible, and may be implemented in accordance to the driver's 900, and/or passenger's preferences.

Once the platform 100 is firmly in place, the end-user 900 may attach one, or two stanchion bases 200 to the platform's 100 top surface 103. The stanchions 200 are attached to the platform 100 using the same metal-bonding adhesive. The adhesive is applied to the bottom surface 202 of the stanchion 200, and positioned on the top surface middle section 104 of the platform 100.

The number of the attached stanchions 200 depends on the end-user's 900 selection choice of the handle bar. Handle bars come in different shapes and sizes, including: I-shaped 300 (shown in FIGS. 1, 2 and 3), U-shaped 400 (shown in FIG. 4), H-shaped 500 and goalpost-shaped 600 bars, both shown in FIG. 5.

Figure 4:
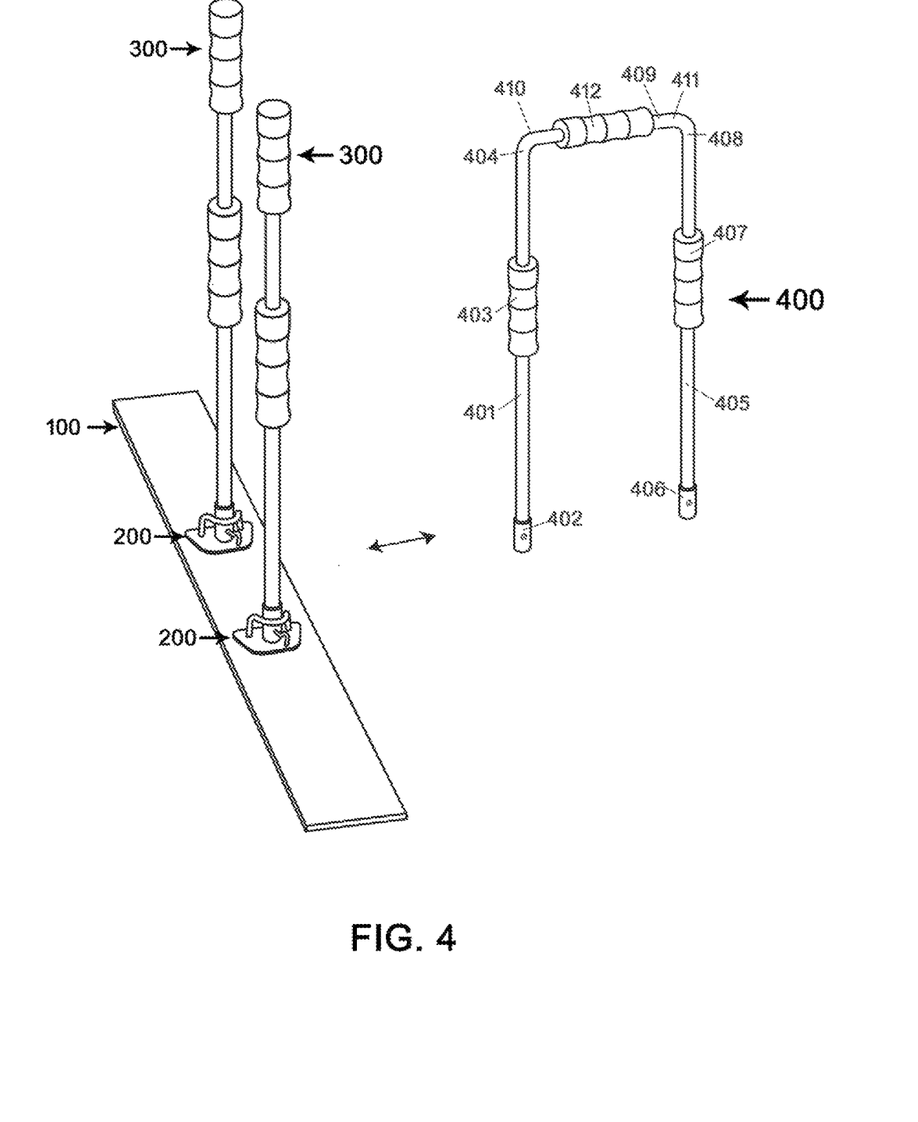
FIG. 4 is a perspective view of the safety platform, with two stanchion bases attached to its top surface, each supporting a single I-shaped handle bar, and located next to it, is a perspective view of the U-shaped handle bar, in accordance with an exemplary embodiment of the present invention.
Figure 5:
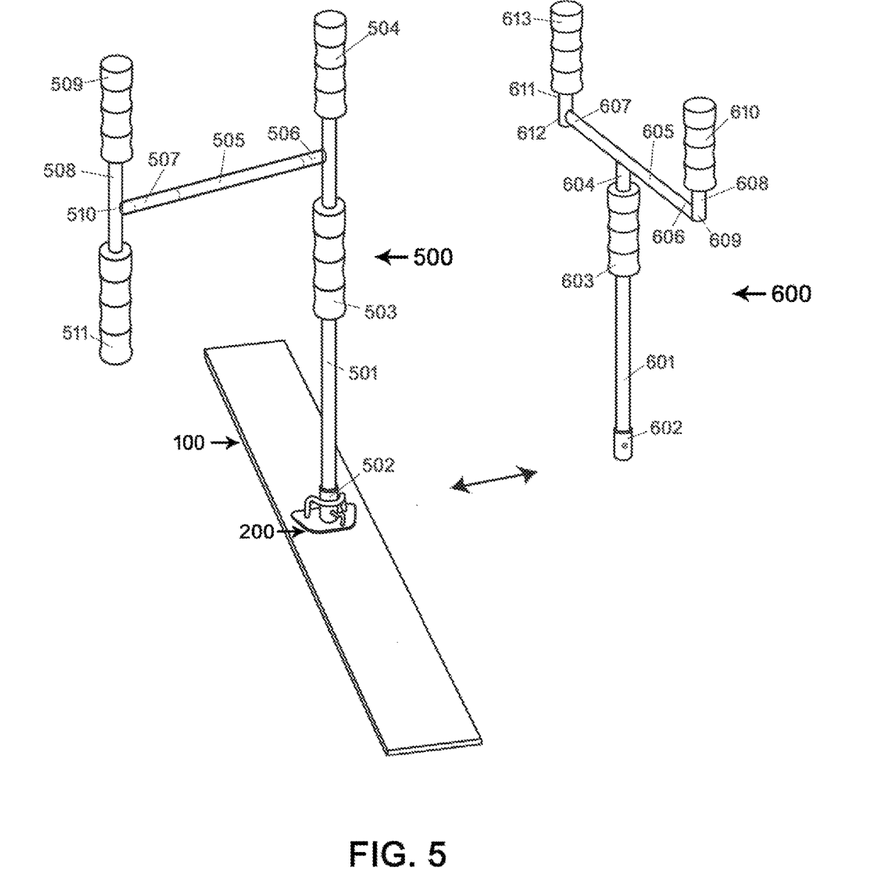
FIG. 5 is a perspective view of the safety platform, H-shaped handle bar, and the goalpost-shaped handle bar; wherein said H-shaped handle bar is attached, via the stanchion base, to the safety platform's top surface, and located next to it, is a perspective view of the goalpost-shaped handle bar, in accordance with an exemplary embodiment of the present invention.

As shown in FIGS. 1, 2, 5 and 6, when attaching either the goalpost-shaped 600, H-shapes 500, or a single, I-shaped 300 handle bar, the end-user 900 will utilize only one stanchion base 200. However, if the end-user 900 is simultaneously attaching two I-shaped 300 handle bars, or a single U-shaped 400 bar, the end-user 900 must utilize two stanchion bases 200, as shown in FIG. 4.

To attach any handle bar into the stanchion base 200, the end-user 900 must insert the mounting end of the bar into the vertical socket 203 opening of the stanchion base 200. Once inserted the bar must be locked in place. To lock the bar in place the end-user 900 will insert the socket pin 205 into the vertical socket pinhole 204, through the matching pinhole of the bar's mounting end. Once this step is completed, the handle bar is firmly in place, and ready for its application.

Figure 1:
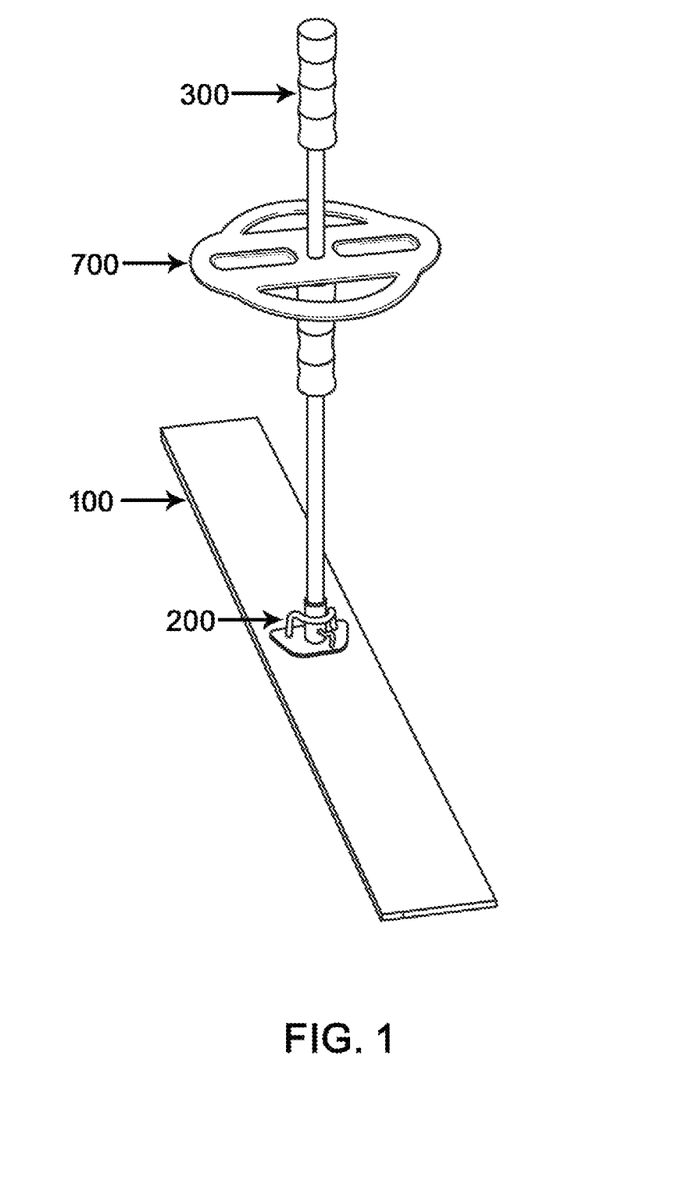
FIG. 1 is a perspective view of the safety platform, stanchion base, !-shaped handle bar, the food and accessory tray; wherein said stanchion base is attached to the top surface of the safety platform's middle section, supporting the I-shaped handle bar with the food and accessory tray attached thereto, in accordance with an exemplary embodiment of the present invention.
Figure 2:
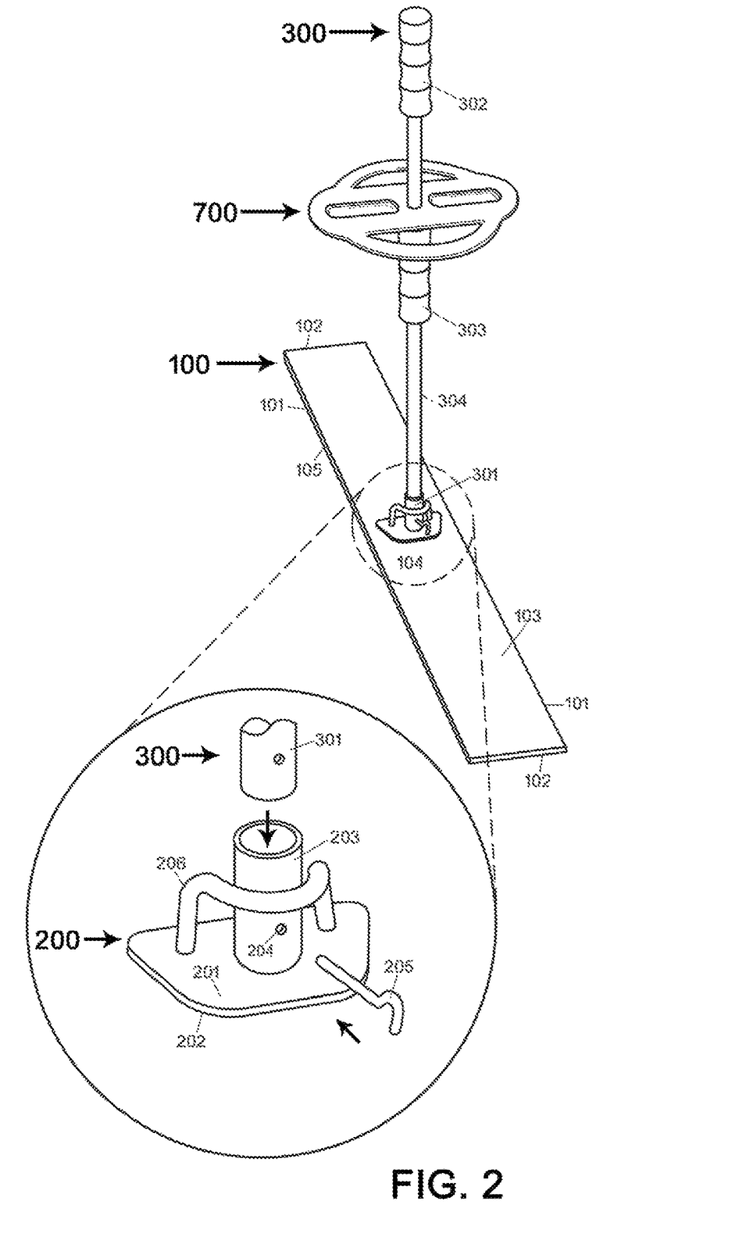
FIG. 2 is a similar view of the safety platform, stanchion base, I-shaped handle bar, the food and accessory tray; wherein said stanchion, and the !-shaped handle bar's mounting end, are shown in enlarged detail view, in accordance with an exemplary embodiment of the present invention.
Figure 3:
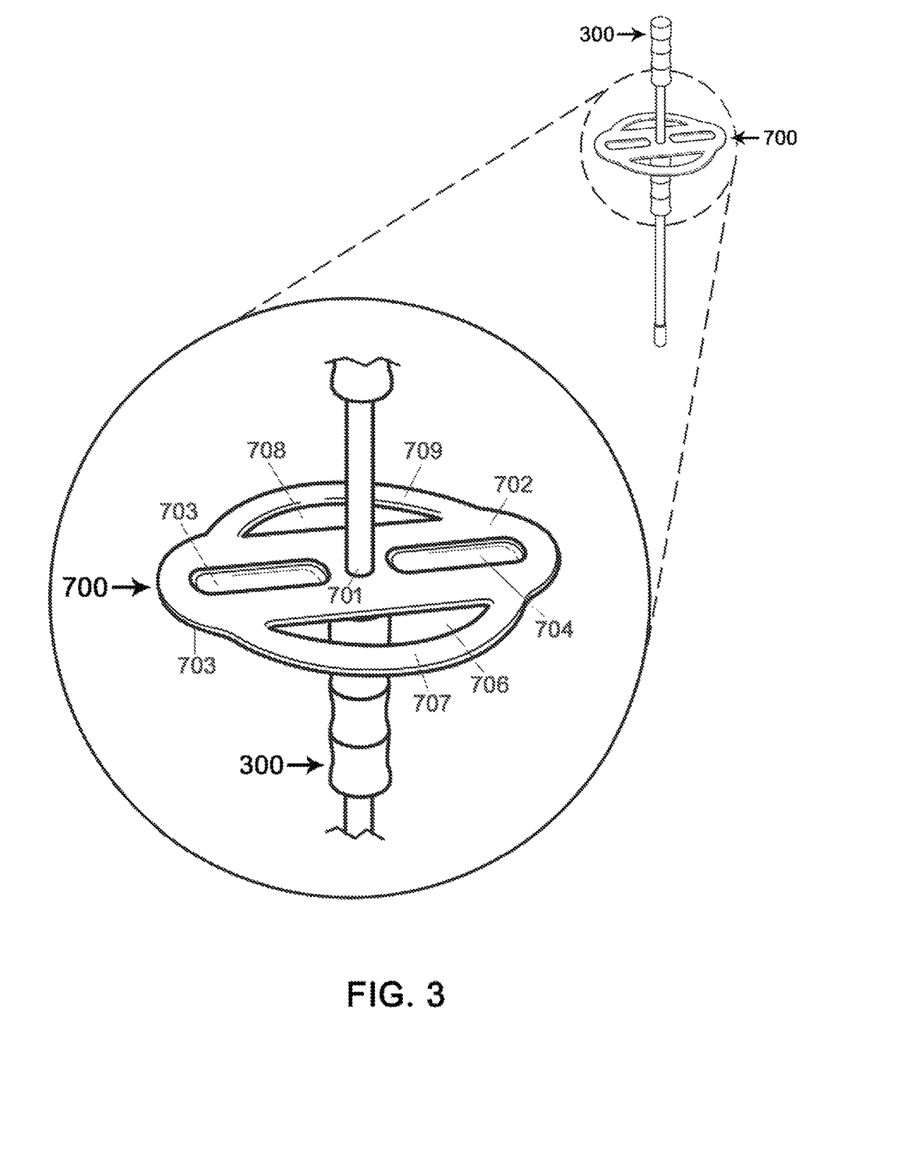
FIG. 3 is a perspective view of the food and accessory tray, mounted onto the I-shaped handle bar; wherein said food and accessory tray is shown in enlarged detail view, in accordance with an exemplary embodiment of the present invention.

The invention also incorporates the food and the accessory tray 700, shown in FIGS. 1, 2 and 3. The tray 700 is mounted to a handle bar, using the centrally-located mounting hole 701. All of the above-listed handle bars accept the food and accessory tray 700, via the same method. The tray 700 comprises of the top 702 and the bottom 705 surfaces, wherein said top 702 surface houses the first 703 and the second 704 elongated pocket, designed to hold the end-user's 900 personal accessories and food.

The tray 700 also contains the first 706 and the second 708 cutouts, which create an opening in both the top 702 and the bottom 705 surfaces. These cutouts 706, 708, form first 707 and the second 709 oval grip handles. The tray grip handles 707, 709, providing the end-users 900 with extra surfaces to hold on to, when driving the golf cart 800 through difficult terrain.

What is claimed is:
1. A golf cart safety platform with interchangeable handle bars, comprising:

a plurality of interchangeable handle bars comprising an I-shaped, a U-shaped, an H-shaped and a goalpost shape handle bar, each of said handle bars adapted to be outfitted with a food and accessory tray;

a safety platform, having a long side, a short side, a top surface, a top surface middle section, a bottom surface, forming a rectangular shape, designed to be placed in the golf cart, said golf cart having, a seat, a floor, a dash board, a steering column, an accelerator pedal, and a brake pedal; wherein said safety platform is positioned on the golf cart's floor, between the seat and the dash board, near the accelerator and the brake pedal, wherein the bottom surface of the platform is glued to the golf cart's floor, exposing the top surface of the platform to the steering column;

a stanchion base, having a top surface, a bottom surface, a vertical socket, a vertical socket pinhole, a socket pin, a socket supporting rod arch, wherein said stanchion base is adapted to interchangeably hold one of said plurality of interchangeable handle bars and said food accessory tray wherein said stanchion bottom surface is glued to the top surface middle section of the safety platform; and wherein said I-shaped handle bar, comprises a vertical bar, a mounting end, with a pin hole, a handle grip end, a middle handle grip, and is adapted to be mounted to the stanchion base by said mounting end, being inserted into the vertical socket of the stanchion base, and secured in place by pushing the socket pin into the vertical socket pin hole, through the mounting end's pin hole, allowing the I-shaped handle bar to maintain a vertical position, and by doing so provide a driver of the golf cart with a grip handle.

2. The golf cart safety platform of claim 1 wherein said U-shaped handle bar comprises:

a first vertical bar, having a first vertical bar mounting end, with a pin hole, a first vertical bar middle handle grip, a first vertical bar transition end; a second vertical bar, having a second vertical bar mounting end, with a pin hole, a second vertical bar middle handle grip, a second vertical bar connecting end; and a horizontal bar, having a first end, a second end, a middle section handle grip, wherein said horizontal bar's first end connects with the first vertical bar transition end, and the second end of the horizontal bar connects with the second vertical bar connecting end, forming the U-shaped handle bar, wherein said U-shaped bar is adapted to be interchangeably secured to the safety platform using two stanchion bases, and locked in place by inserting the first and the second vertical bar mounting ends into their respective stanchions, and securing them in place by pushing their socket pins into the vertical socket pin holes, through the mounting end's pin holes, providing the golf cart driver with a surface to hold on to during the drive.

3. The golf cart safety platform of claim 1 wherein said H-shaped handle bar comprises:

a long vertical bar, having a mounting end, with a pin hole, a middle section grip handle, a handle grip end;
a horizontal bar, having a first end, a second end; and a short vertical bar, having a first handle grip end, a middle section, a second handle grip end, wherein said first end of the horizontal bar is connected to the long vertical bar, above the middle section grip handle, and the second end of the horizontal bar is connected to the middle section of the short vertical bar, forming an H-shaped handle bar, wherein said H-shaped bar is adapted to be interchangeably secured to the safety platform using one stanchion base, and locked in place by inserting the mounting end, with a pin hole into the vertical socket of the stanchion base, and secured in place by pushing the socket pin into the vertical socket pin hole, through the mounting end's pin hole, allowing the H-shaped handle bar maintain a vertical position, and by doing so provide the golf cart driver with a grip handle.

4. The golf cart safety platform of claim 1 wherein said goalpost-shaped handle bar comprises: a long vertical bar, having a mounting end, with a pin hole, a middle section grip handle, a connecting end;

a horizontal bar, having a first end, a second end, a middle section;
a first short vertical bar, having a connecting end, a handle grip end; and
a second short vertical bar having a connecting end, a handle grip end, wherein said first end of the horizontal bar, connects to the connecting end of the second short vertical bar, and the second end of the horizontal bar, connects to the connecting end second short vertical bar, and the connecting end of the long vertical bar, connects to the middle section of the horizontal bar, forming the goalpost-shaped handle, wherein said goalpost-shaped handle bar is adapted to be interchangeably secured to the safety platform using one stanchion base, and locked in place by inserting the mounting end, with a pin hole into the vertical socket of the stanchion base, and secured in place by pushing the socket pin into the vertical socket pin hole, through the mounting end's pin hole, allowing the goalpost-shaped handle bar maintain a vertical position, and by doing so provide the golf cart driver with a grip handle.

5. The golf cart safety platform of claim 1 wherein said food and accessory tray comprises:

a mounting hole;
a top surface, having a first elongated pocket, and a second elongated pocket; and
a bottom surface, having a first cutout, a first oval grip handle, a second cutout, and a second oval grip handle, wherein said top surface houses the first and the second elongated pockets, designed to hold the golf cart driver's personal accessories and food, wherein said first and the second cutout, penetrating through the top and the bottom surfaces, create the first and the second oval grip handles, which can be used by the golf cart driver to hold on to during driving, wherein said food and accessory tray can be mounted, using the centrally-located mounting hole, in alternative to the vertical bar of the I-shaped handle bar, or the first vertical bar of the U-shaped handle bar, or the second vertical bar of the U-shaped handle bar, or long vertical bar of the H-shaped handle bar, or long vertical bar of the goalpost-shaped handle bar.

* * * * *